United States Patent [19]

Todd et al.

[11] 4,049,159

[45] Sept. 20, 1977

[54] HAND DRIVE FOR BLENDING-TYPE GASOLINE DISPENSER

[75] Inventors: John Arnold Todd; George Edward Chevallier, both of Salisbury, Md.

[73] Assignee: Dresser Industries, Inc., Dallas, Tex.

[21] Appl. No.: 729,062

[22] Filed: Oct. 4, 1976

[51] Int. Cl.[2] .......................... B67D 5/60; F16H 37/06; B60L 5/40

[52] U.S. Cl. .......................... 222/144.5; 222/333; 74/665 GA; 192/48.91; 417/429

[58] Field of Search .......................... 222/144.5, 333; 417/319, 429; 192/48.91, 48.92; 74/665 G, 665 E, 665 GA, 665 P

[56] References Cited

U.S. PATENT DOCUMENTS 1,318,718 10/1919 Belk .......................... 417/429

*Primary Examiner*—Stanley H. Tollberg
*Assistant Examiner*—Hadd S. Lane
*Attorney, Agent, or Firm*—Daniel Rubin

[57] ABSTRACT

A hand drive for manually operating a blender-type gasoline dispenser in the event of power disruption, including a crank operated shaft mounted for rotation and which is axially presettable relative to the pump drives for selectively operating either or both of the dispenser pumps. Laterally extending from the shaft are a pair of spaced pins for rotatably coupling the shaft with the drive sheave of the selected pump or pumps. Presetting the shaft axially with the pins in a first position rotatably couples the shaft via one of the pins to one sheave for high octane dispensing while the other pin and respective sheave remain disengaged. Setting the shaft in a second position rotatably couples the shaft via the other of the pins to the second sheave for low octane dispensing while the first pin and respective sheave remain disengaged. A third setting of the shaft intermediate between the first and second positions couples both sheaves for simultaneously operating both pumps to effect a dispensing of blended high and low octane fuels.

7 Claims, 8 Drawing Figures

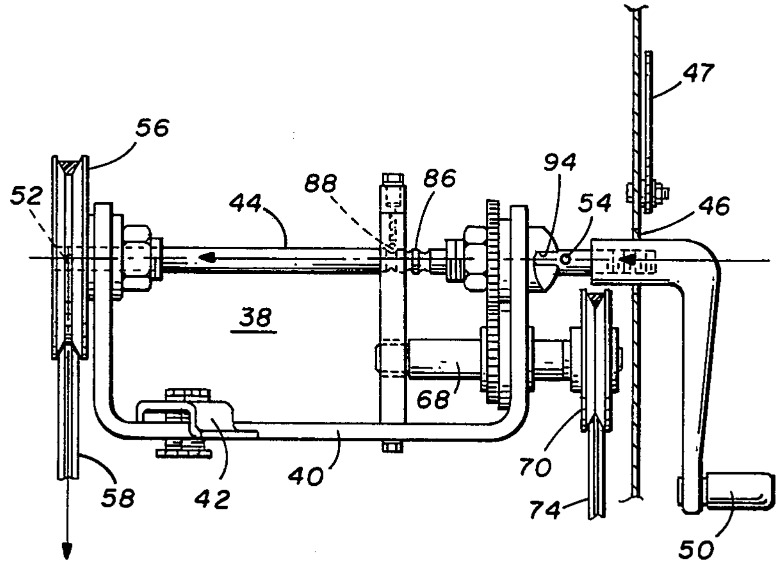
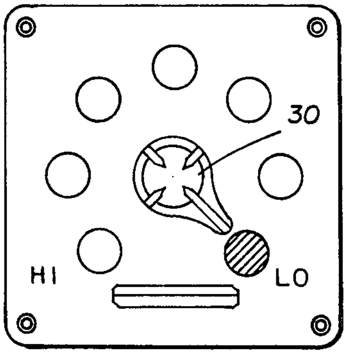
FIG. 6
FIG. 3
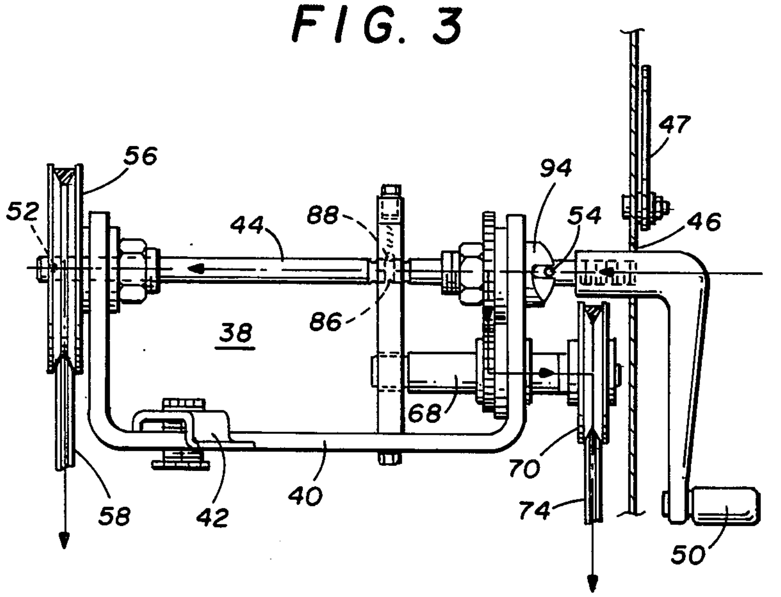
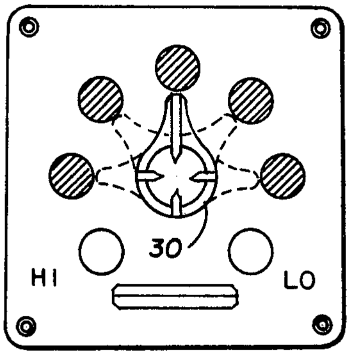
FIG. 7
FIG. 4
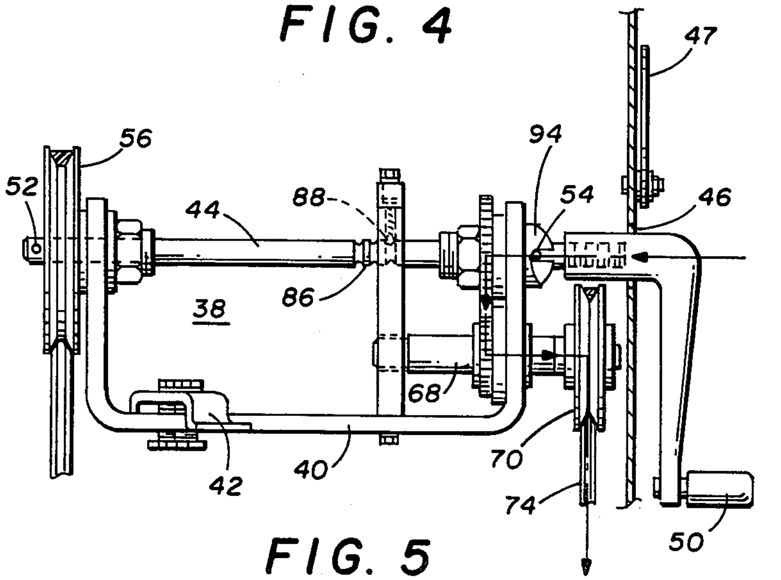
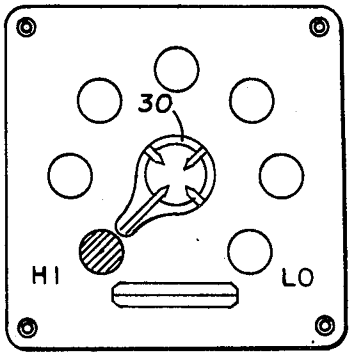
FIG. 8
FIG. 5

HAND DRIVE FOR BLENDING-TYPE GASOLINE DISPENSER

BACKGROUND OF THE INVENTION

1. The field of art to which the invention pertains comprises the art of manual drive mechanisms for hand operation of a gasoline dispenser.

2. Except in rare instances, gasoline dispensing pumps throughout the world are electrically powered. Failure, however, to provide for manual operation in the event of a power disruption can cause the dispenser to remain idle for extended time periods, however long the power disruption continues. Consequently, it is not uncommon, particularly in remote areas in which power failures occur with some degree of frequency, to provide backup capability whereby a hand drive can be utilized to manually operate the dispenser in the absence of electrical power. Exemplifying equipment for that purpose is the disclosure of U.S. Pat. No. 2,898,002.

A characteristic construction of a prior art hand unit for operating gasoline dispensing pumps has been a separate hand drive for each pump unit within the dispenser to be adapted for manual operation. For a double pump dispenser, two manually operated devices have been employed for operating one or the other of the two pump units. While this arrangement has been generally satisfactory, it represents a duplication of equipment and is regarded as suitable where no more than two available octane choices are to be selected by the customer. Complicating this prior art approach are blend-type dispensers in which a separate high and low octane pumping unit can be set either to operate independently of each other or simultaneously together for dispensing a variety of different blends of intermediate octane. For the latter, such individual hand units have been recognized as highly impractical. Yet despite recognition of the problem, a single hand apparatus readily operable in the various operational modes of a blend-type dispenser has not been previously known.

SUMMARY OF THE INVENTION

The invention relates to hand drive apparatus for a gasoline pump dispenser and more specifically to such an apparatus for blend-type dispensers whereby a single hand drive is selectively settable for otherwise maintaining the entire operational mode of the electrically powered unit. By affording full range operability of a blend-type dispenser, utility of the dispenser is not lost or restricted during existence of a power disruption while use of a single hand drive for that purpose significantly simplifies the operating mechanism over that which would have previously been required.

For effecting the foregoing in accordance herewith, the hand drive of the invention is formed of an assembly contained within the dispenser cabinet and belt connected separately to each of the individual high octane and low octane pump units. A central shaft, adapted for cranking rotation, supports a pair of laterally extending spaced apart pins, each operably engageable for coupling the shaft with the belt drives of the individual pump units. The shaft is axially slideable onto one of three presettable selection positions whereby the shaft pin or pins will couple one or the other of the high octane unit, the low octane unit or both units simultaneously for dispensing a blend mixture thereof. By affording this capability with a relatively simple mechanical device in the manner hereof, the intended operational mode of the dispenser is fully retained, thereby enhancing its versatility, particularly in those localities in which long lasting power failures occur with a high degree of frequency.

It is, therefore, an object of the invention to afford a novel hand drive for a blend-type gasoline dispenser.

It is a further object of the invention to provide a novel hand drive as in the previous object capable of fully retaining the intended operational mode of the dispenser on a manual basis.

It is a further object of the invention to obtain the previous objects with a single mechanical mechanism that is selectively settable for individually dispensing available low or high octane fuels or dispensing both simultaneously for effecting a blended combination thereof.

It is a still further object of the invention to effect the foregoing objects with an apparatus that is simple to operate and relatively inexpensive to manufacture, yet manually fulfills all the operating requirements of the dispenser on disruption of electric power supply thereto.

BRIEF DESCRIPTION OF THE DRAWINGS

FIGS. 3, 4 and 5 illustrate the three position settings of the hand drive mechanism for low octane, blend and high octane pump dispensing, respectively; and

FIGS. 6, 7 and 8 are end views of the blend selector assembly for the hand drive positions of FIGS. 3, 4 and 5, respectively.

Referring now to FIG. 1 of the drawings, there is illustrated a gasoline dispenser unit 10 comprised of the usual cabinet structure 112 (in phantom) containing pump motors 14 and 16. Via belts 18 and 20 the motors are connected to drive sheaves 22 and 24 to separately operate pumps 26 and 28 for dispensing high and low octane fuel, respectively. In normal operation, actuating one or both of the pumping units as required is under selected control of appropriate switching and a blend selector dial 30. Dial 30 operates in a well known manner for setting a blend valve assembly 32 of a type disclosed, for example, in U.S. Pat. Nos. 2,977,970 or 2,880,908 whereby fuel of selected octane is dispensed through one of hoses 34 or 36. Operation of the unit is normally powered electrically but to enable operation in the event of a power failure or disruption, there is provided the hand drive unit 38 in accordance herewith as will now be more specifically described with respect to all drawing figures.

Figure 1:
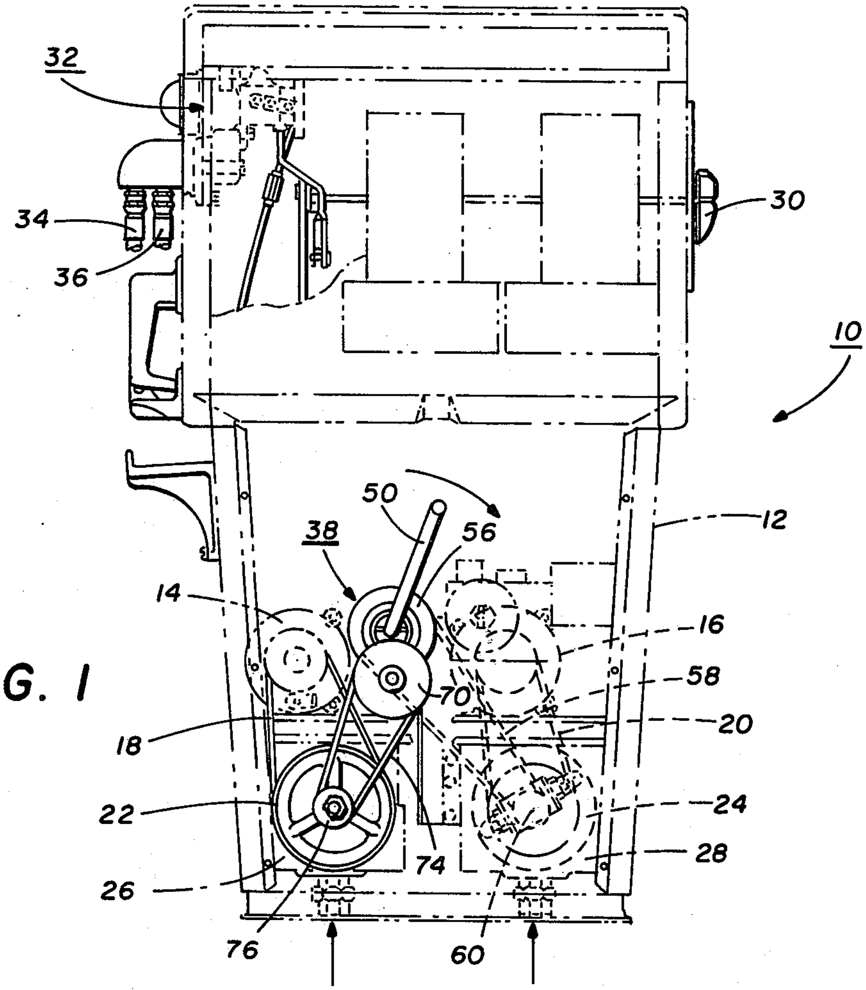
FIG. 1 is an elevation view of the pertinent portions of a blend-type gasoline dispenser incorporating the hand drive of the invention.

Comprising hand drive assembly 38 hereof is a U-shaped yoke or support 40 adapted for mounting to a stationary portion of the cabinet via a screw mounted bracket 42. Extending transversely through the side arms of bracket 40 as to be selectively slideable therebetween is a central shaft 44 positioned axially coincident with an opening 46 is cabinet 42, and threaded at 48 for receiving a detachable crank 50 shown in phantom. A metal disc 47 normally covers opening 46 to prevent entry of dirt or the like. Secured to shaft 44 as to be laterally extending therefrom are pins 52 and 54 controllably spaced apart and by which the drive connections are selectively coupled to the shaft as will be understood.

Figure 2:
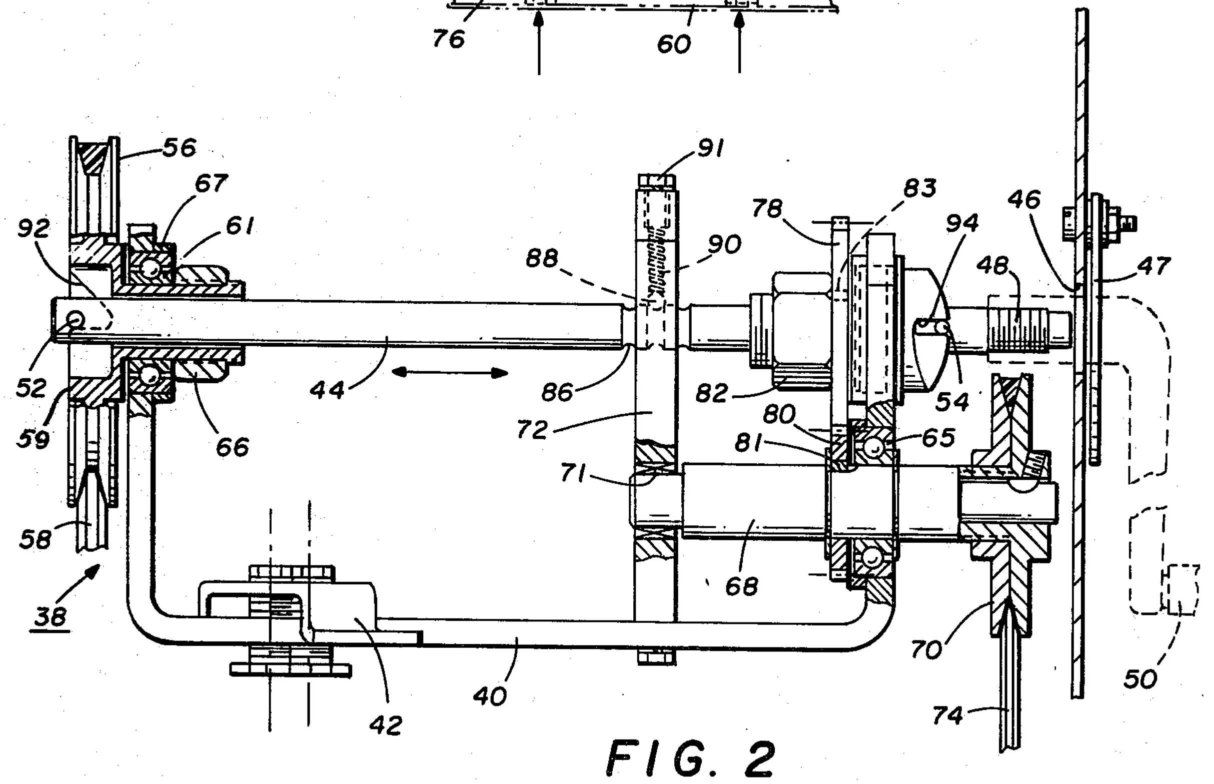
FIG. 2 is an enlarged plan view sectioned in part of the hand drive mechanism.

For driving low octane pump 28 there is rotatably mounted on the left yoke arm of support 40 (as viewed in FIG. 2) a pulley 56 supporting a V-belt 58 in turn connecting with a drive sheave 60 of the pump. Supporting pulley 56 as to be rotatably free of shaft 44, is an elongated overbored hub 59 cantilever mounted in bearing 61 and secured via a lock nut 66 and a spacer 67. Included within the main body of hub 59 is a longitudinal open ended cam slot 92 in which shaft pin 52 is received.

For driving high octane pump 26 there is mounted within a bearing 65 in the opposite support arm a stub shaft 68 supporting a pulley 70 and mounted at its free end via an oilite bearing 71 to an intermediate support plate 72. Pulley 70 in turn supports a drive belt 74 connecting with drive sheave 76 of pump unit 26. Providing a driving connection to shaft 70 are gears 78 and 80, the latter of which is coupled by key 81 to shaft 68 while the former is keyed at 83 to the hub of adapter 84 which is supported rotationally free of shaft 44. Lock nut 82 is threaded onto the adapter hub which at its opposite end includes a longitudinal open ended slot 94 for receiving pin 54.

Formed in the periphery of shaft 44 at an intermediate location generally coinciding with the longitudinal position of support plate 72 are these juxtapositioned annular recesses 86, each adapted to receive a ball detent 88 biased inwardly of the groove via a coil spring 90 compressed by a capscrew 91. With shaft 44 being axially slideable through the drive mounts within the limits provided by the spacing of pins 52 and 54, it is possible to axially position the shaft such that detent 88 will locate precisely within one of the recesses 86 selected corresponding to the contemplated mode of the dispenser. The latter can be best understood with specific reference to FIGS. 3–5.

In FIG. 3, it can be seen that shaft 44 is in its rightmost position placing detent 88 in the leftmost recess 86 whereby pin 52 is positioned innermost within the limits of pulley slot 92, while at the same time pin 54 is displaced outwardly free of slot 94. The effect thereof is to rotationally couple pulley 56 with shaft 44 while uncoupling the drive connection to pulley 70. In this relation, therefore, rotation of shaft 44 via crank 50 will operate pump unit 28 such that when selector 30 is in the appropriate position of FIG. 6, dispensing of low octane fuel can be effected.

In FIG. 4, shaft 44 is positioned to receive detent 88 within the intermediate recess 86 at which setting pin 52 is still contained more outwardly within slot 92, whereas pin 54 is likewise received positioned outwardly within slot 94. In this arrangement, rotation of shaft 44 via crank 50 will continue to drive belt 58 for operating pump 28 whereas pin 54 will concomitantly therewith couple the shaft gears 78 and 80 to pulley 70 for operating high octane pump 26. With both pumps being actuated via crank rotation of shaft 44, a mixture of high and low octane fuel is dispensed to correspond to any one of the blend settings determined by the set position of selector 30 as seen in FIG. 7.

Finally, as seen in FIG. 5, sliding the shaft 44 to its leftmost position places detent 88 in rightmost recess 86 in which position pin 52 is located outwardly free of slot 92 whereas pin 54 extends inwardmost of slot 94. In this relation, the rotational coupling with shaft 44 for operating pump 26 is continued from the previous setting while pump 28 becomes uncoupled and therefore inoperative.

To effect manual hand operation in accordance herewith, it is necessary only that metal disc 47 be rotated from cabinet opening 46 to expose the threaded end of shaft 44 on which crank 50 can be mounted. On appropriately shifting shaft 44 slideably relative to detent 88, the detent can be seated in the recess position 86 corresponding with the setting of blend selector 30. With the selected recess so positioned one or both of pumps 26 and 28 can be operated via crank 50 for dispensing a fuel or fuel mixture of the desired octane level. Should the position setting of shaft 44 not coincide with the setting of blend selector 30, manual operation will be prevented by the uncorrelated operation of blend valve 32. In the event power is restored unexpectedly during manual operation crank 50 will unscrew from shaft 44 which in turn will be moved to an end position by powered rotation of the pulleys reacting against the slope of cam slot 92.

By the above description there has been disclosed a novel hand drive unit for a blend-type gasoline pump enabling manual operation during power disruption as to otherwise manually afford full operating capability of the dispenser in its intended mode. By means of a simple and relatively inexpensive mechanism in accordance herewith, a long standing problem providing standby hand drive operation for blender type gasoline dispensers has been resolved in an efficient and highly economical manner.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a motor driven blender-type gasoline dispenser including a first motor driven pump adapted for operable connection to a first source of low octane level gasoline for dispensing, a second motor driven pump adapted for operable connection to a second source of relatively high octane level gasoline for dispensing and blender means operative to simultaneously actuate both motors of said pumps for dispensing a blended mixture of the gasolines from each of said sources, the improvement which comprises a hand drive for manually operating said dispenser comprising in combination an operating shaft mounted for hand driven rotation, drive means drive connected individually with each of said pumps and selection means presettable to selectively connect said drive means with said operating shaft for optionally actuating said first pump alone, said second pump alone or said first and second pumps simultaneously.

2. In a blender-type gasoline dispenser according to claim 1 in which said hand drive means is supported in drive-free relation about said operating shaft and said operating shaft includes lateral offset means extending therefrom, said offset means being presettably positionable by said selection means to rotatably couple said operating shaft with the selected pump drive connection of said drive means.

3. In a blender-type gasoline dispenser according to claim 2 in which said selection means includes means to transversely displace said hand offset means relative to said drive means for said selection means to presettably couple said operating shaft with the selected drive connection for one or both of said pumps.

4. In a blender-type gasoline dispenser according to claim 3 in which said hand drive means includes spaced apart individual drive connections for each of said pumps, said operating shaft is supported rotationally free of each of said pump drive connections, said offset means comprises a lateral extension extending from said shaft at the location of each of said individual pump drive connections and said selection means includes means to axially displace said operating shaft longitudinally into one of a plurality of reference position settings for at least one of said extensions to couple said operating shaft with the drive means pump drive connection to be selected.

5. In a blender-type gasoline dispenser according to claim 4 in which each of the pump drive connections supported about said operating shaft defines an internal recess adapted to receive one of said lateral extension for coupling the operating shaft thereto in either of two reference position displacement settings of said operating shaft.

6. In a blender-type gasoline dispenser according to claim 5 in which said plurality of reference positions consists of three position settings for said operating shaft, one of said positions being common for the simultaneous coupling of both of said pump drive connections.

7. In a blender-type gasoline dispenser according to claim 6 in which said common reference position is located on said operating shaft longitudinally intermediate the others of said reference positions.

* * * * *